(12) United States Patent
Schimitzek

(10) Patent No.: US 8,016,649 B2
(45) Date of Patent: Sep. 13, 2011

(54) POSITIONING DEVICE FOR THE HALVES OF SLAUGHTERED ANIMAL BODIES FOR OPTICAL CAPTURE IN THE CLEAVING PLANE

(75) Inventor: Peter Schimitzek, Geilenkirchen (DE)

(73) Assignee: CSB-System AG, Geilenkirchen (DE)

(*) Notice: Subject to any disclaimer, the term of this patent is extended or adjusted under 35 U.S.C. 154(b) by 0 days.

(21) Appl. No.: 13/000,217

(22) PCT Filed: Jul. 15, 2009

(86) PCT No.: PCT/DE2009/000980
§ 371 (c)(1),
(2), (4) Date: Dec. 20, 2010

(87) PCT Pub. No.: WO2010/006587
PCT Pub. Date: Jan. 21, 2010

(65) Prior Publication Data
US 2011/0111682 A1    May 12, 2011

(30) Foreign Application Priority Data
Jul. 17, 2008    (DE) .................. 20 2008 009 594 U

(51) Int. Cl.
*A22B 7/00* (2006.01)

(52) U.S. Cl. ....................................................... 452/187

(58) Field of Classification Search .................. 452/160, 452/187, 189, 157, 158
See application file for complete search history.

(56) References Cited

U.S. PATENT DOCUMENTS

| | | | | |
|---|---|---|---|---|
| 3,916,482 A * | 11/1975 | Kvilhaug | ....................... | 452/152 |
| 3,916,484 A * | 11/1975 | Kennedy | ....................... | 452/159 |
| 4,651,384 A * | 3/1987 | Korhonen | ....................... | 452/187 |
| 5,194,036 A * | 3/1993 | Chevalier et al. | .............. | 452/198 |
| 5,470,274 A | 11/1995 | Kadi et al. | | |
| 5,626,515 A * | 5/1997 | Krogh | ............................ | 452/187 |
| 5,944,598 A * | 8/1999 | Tong et al. | ..................... | 452/158 |
| 6,290,592 B1 * | 9/2001 | Allen et al. | ...................... | 452/58 |
| 6,692,345 B1 * | 2/2004 | Kruger | ............................ | 452/177 |

FOREIGN PATENT DOCUMENTS

| | | |
|---|---|---|
| DE | 30 49 589 | 7/1982 |
| EP | 0 632 960 | 1/1995 |
| EP | 0 730 146 | 9/1996 |
| FR | 2 545 010 | 11/1984 |
| FR | 2 694 479 | 2/1994 |
| WO | 2004/068950 | 8/2004 |

* cited by examiner

*Primary Examiner* — Thomas Price
(74) *Attorney, Agent, or Firm* — Michael J. Striker

(57) ABSTRACT

A positioning apparatus for animal carcass halves, particularly slaughtered pig halves, arranges a cleaving plane to be aligned in parallel with an imaging plane of a camera. The positioning apparatus includes a rear guide element disposed movably at a level of an upper guide. In a region of an imaging position of a slaughtered pig half, the positioning apparatus includes rollers operating as pressure elements.

16 Claims, 1 Drawing Sheet

POSITIONING DEVICE FOR THE HALVES OF SLAUGHTERED ANIMAL BODIES FOR OPTICAL CAPTURE IN THE CLEAVING PLANE

CROSS-REFERENCE TO RELATED APPLICATION

The invention described and claimed hereinbelow is also described in German Patent Application DE 20 2008 009 594.8 filed on Jul. 17, 2008. This German Patent Application, whose subject matter is incorporated here by reference, provides the basis for a claim of priority of invention under 35 U.S.C. 119(a)-(d).

BACKGROUND OF THE INVENTION

The invention relates to a positioning device for halves of slaughtered animal bodies, in particular pig halves, suspended on hooks for optical capture in the cleaving plane with subsequent evaluation and classification.

In slaughterhouses and meat processing installations, halves of slaughtered animal bodies, such as pig halves, are usually transported suspended on a single hook, Euro hook, e.g. via tubular tracks, wherein the left and right half of a slaughtered animal are suspended on successive hooks.

Evaluation and classification of pigs are carried out according to the relevant requirements on the basis of the left half, e.g. by means of optical image processing, for which purpose an optical capture is effected in the cleaving plane, such as in the ham and loin region, with the aid of an electronic camera.

In order to avoid parallax errors, which would lead to measurement errors during computer-aided evaluation of the captures and to incorrect quality classification and evaluations, the halves of slaughtered animal bodies are guided in a known manner in the cleaving plane by at least two guide tubes or elements, which are disposed in a horizontally in a fixed manner vertically one above the other with a sufficient spaced disposition, outside the relevant capture region.

In practice it may be the case that halves suspended on single hooks are not aligned exactly in parallel with the capture plane owing to the position of the centre of gravity being unfavourable or owing to poor sliding movement on the guides.

DE 30 49 589 A1 discloses a device for classifying meat using a plate to align the slaughtered animal halves in the measuring station. The slaughtered animal halves are supplied to the measuring station with video cameras for sensing the slaughtered animal halves along a transport track.

An alignment plate is disposed on a support bracket and is in the form of a scoop with a rectangular contact surface. The alignment plate is brought towards the transport track by means of a working cylinder. The slaughtered animal half comes to lie against the plate by reason of its own weight, and video capture takes place.

The alignment plate used for positioning purposes is constructionally and mechanically complex, wherein, in addition, only small through-put quantities of halves of slaughtered animal bodies can be classified.

SUMMARY OF THE INVENTION

The object of the invention is to develop a positioning device for halves of slaughtered animal bodies, in particular slaughtered pig halves, for parallel alignment of the cleaving plane with respect to the capture plane of a camera.

A positioning device for halves of slaughtered pigs for optical capture in the cleaving plane, in particular in the ham and loin region, consists substantially of at least two front guide tubes or elements, which are disposed in parallel and horizontally on vertical supports vertically one above the other with a sufficient spaced disposition, outside the relevant capture region, and of at least one guide element, which is disposed in a movable manner with respect to the cleaving side preferably behind the upper guide tube and, in the capture position of the slaughtered pig half, comprises rollers as pressure elements.

In cooperation with the front guide tubes or elements, the rollers in the capture region ensure the precisely parallel alignment of the cleaving plane with respect to the capture plane of the camera.

The axes of the rollers are offset with respect to each other in the horizontal plane in the capture region in such a way that, over a region of their periphery, these rollers press the cleaving plane over the whole surface of the back contour against the front guide tube or element so that the parallelism for the capture plane of the camera is ensured.

Alternatively, the rollers can have different diameters in the back region of the slaughtered pig half in order to be able to apply pressure over the contour at least three points.

The guide element with the rollers is received by two angled levers each with a weight, wherein the axis of rotation of the levers is preferably disposed in extensions of the vertical retainers of the guide element at a fixed point.

Optionally, the guide tubes or elements as well as the guide element have at least one roller in each case at the inlet in order to ensure the vertical suspension of the slaughtered pig half in the capture region.

The vertical spaced disposition of the fixed guide tubes or elements is adjustable in order to ensure precise capture of locally imposed size differences in the slaughtered pigs.

Since the pigs are always evaluated on the basis of the left half, it is useful to move the right half past the guide tubes or elements with the back to the camera.

In the region of the inlet to the horizontal guide tubes or elements there is disposed for this purpose a run-up element on which the respective foreleg of the pig half runs up and for the left half effects rotation of the cleaving plane in the direction of the camera position and for the right half effects this with the back.

In an embodiment variation at least one roller is also disposed in each case in the region of the inlet of the slaughtered pig halves on the guide tubes or elements.

In the specific case of supplying the halves suspended on the hook via an inclined tubular track, the axes of the rollers are inclined corresponding to the angle of the tubular track extending over the inlet in order to ensure the vertical position of the half in the capture region of the camera.

The particular advantage of the positioning device consists of the reliable alignment of the cleaving plane of the slaughtered pig half suspended on a hook with respect to the capture plane so that no parallax errors arise during capture and precise evaluation and classification are ensured.

The positioning device is inexpensive to produce and is functionally reliable.

A modular construction for the positioning device is advantageous, so that quick and easy adaptation to required through-put quantities and local conditions in the slaughterhouse is possible.

The positioning device can also be cleaned easily and to a safe standard owing to the solid surface formation of the rollers and to their bearing points being covered.

In a favourable manner all surfaces coming into contact with the slaughtered animal body are provided with a known functional surface which also has an antimicrobial effect.

BRIEF DESCRIPTION OF THE DRAWINGS

The invention will be explained in more detail as an exemplified embodiment with the aid of FIG. 1 as a schematic illustration of the positioning device with a slaughtered pig half in a vertical cross-section.

DESCRIPTION OF THE PREFERRED EMBODIMENTS

Figure 1:
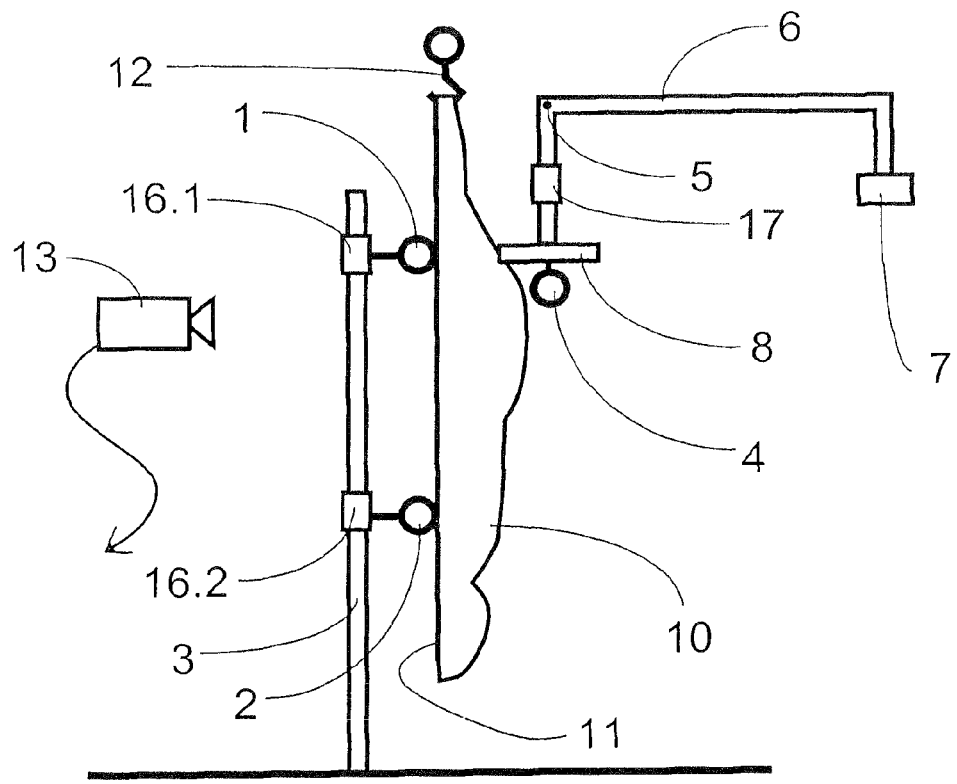

As shown in FIG. 1 a positioning device consists essentially at least of a front upper guide 1 and a lower guide 2 in parallel therewith, on vertical supports 3 (3.1; 3.2) which can be anchored to the ground, and of a rear guide element 4 at one end of a lever 6 (6.1; 6.2), which can be rotated at a fixed point 5 (5.1; 5.2), the other end of which receives a mass 7 (7.1; 7.2).

Figure 2:
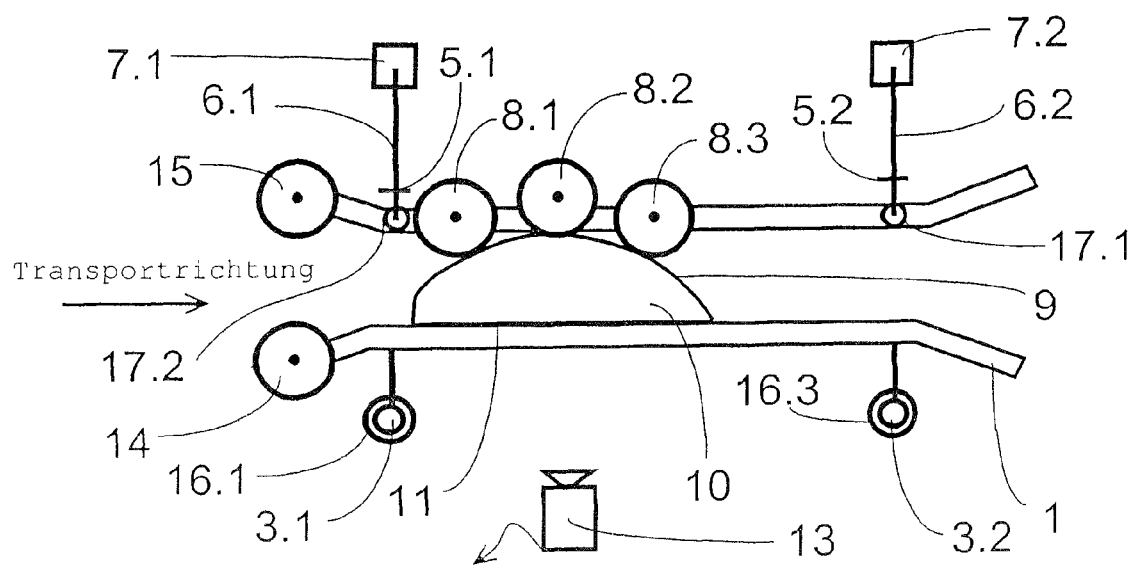
FIG. 2 as a schematic partial cross-sectional view of the positioning device with a slaughtered pig half, shown in the region of the upper guides.

As shown in FIG. 2, in the region of the capture position, rollers 8 (8.1; 8.2; 8.3) are disposed on the rear guide element 3.

The roller 8.2 is axially offset with respect to the rollers 8.1 and 8.3 so that over a back contour 9 of a slaughtered pig half 10, illustrated in a stylised manner in FIGS. 1 and 2, by means of an operative connection of the masses 7.1 and 7.2, the levers 6.1 and 6.2, the rear guide element 4 and the periphery of the rollers 8.1, 8.2 and 8.3 a force is applied at three points, so that the surface of a cleaving side 11 of the slaughtered pig half 10 suspended on a hook 12 on a transport track lies against the guides 1, 2 and is therefore directed in parallel with the capture plane of a camera 13.

In embodiment variations the roller 8.2 can be mounted on the underside of the rear guide element 4, wherein the rollers 8.1 and 8.3 are disposed on the upper side of the guide element, or the roller 8.2 and the rollers 8.1 and 8.3 are disposed on opposite sides, or the roller 8.2 is formed in the manner of two rollers, one of which is disposed above the rear guide element 4 and the other is disposed beneath the rear guide element 4.

At the inlet of the positioning device a further roller 14 is disposed on the upper guide 1 and an additional roller 15 is disposed on the rear guide element 4, which rollers ensure vertical entry of the slaughtered pig half 10 suspended on the hook 12.

The height and vertical spaced disposition of the guides 1; 2 is adapted to the local conditions by means of their adjustable retainers 16 (16.1; 16.2; 16.3) on the vertical supports 3.1 and 3.2, corresponding to the height of the conveying device and the size of the slaughtered pig halves 10.

In order to adapt the height of the rollers 8 (8.1; 8.2; 8.3) on the rear guide element 4 so that the radial middle thereof coincides with the main axis of the upper guide 1, an adjustment element 17 (17.1; 17.2) is provided on the lever 6 or on a retainer of the rear guide element 4 on the lever 6 (6.1; 6.2).

REFERENCE NUMERALS USED

1 upper guide
2 lower guide
3 vertical support (3.1; 3.2)
4 rear guide element
5 fixed point (5.1; 5.2)
6 lever (6.1; 6.2)
7 mass (7.1; 7.2)
8 rollers (8.1; 8.2; 8.3)
9 back contour
10 slaughtered pig half
11 cleaving side
12 hook
13 camera
14 further roller
15 additional roller
16 retainers (16.1; 16.2; 16.3)
17 adjustment element (17.1; 17.2)

The invention claimed is:

1. A positioning device for halves of slaughter animal bodies, suspended on hooks for a parallel alignment of a cleaving plane with respect to a capture plane of a camera for a subsequent evaluation and classification by an optical image processing, comprising at least two guide elements including an upper guide element and a lower guide element disposed substantially horizontally on vertical supports vertically over one another, with a sufficient spaced disposition, outside a relevant capture region facing the camera; and a rear guide element is disposed in a moveable manner and in a region of a capture position of the slaughtered half has rollers as pressure elements.

2. A positioning device as defined in claim 1, wherein said rear guide element is disposed in relation to a cleaving site at a level of said upper guide element.

3. A positioning device as defined in claim 1, wherein said rear guide element is connected to one end of a lever which is rotatable about a fixed point, further comprising a mass located at another end of said rotatable lever.

4. A positioning device as defined in claim 1, wherein said rollers have axes which are offset with respect to each other corresponding to a back contour in a back region of the slaughtered half in a horizontal plane in the capture region.

5. A positioning device as defined in claim 1, wherein said rollers have different diameters corresponding to a back contour in a back region of the slaughtered half.

6. A positioning device as defined in claim 1, wherein one of said rollers and two other of said rollers are disposed on opposite sides of said rear guide element.

7. A positioning device as defined in claim 6, wherein said one roller is formed in a manner of said two rollers, one of which being disposed above said rear guide element and another of which being disposed beneath said rear guide element.

8. A positioning device as defined in claim 1, further comprising a further roller disposed at an inlet of the positioning device on an upper one of said guides and an additional roller disposed on said rear guide element.

9. A positioning device as defined in claim 8, wherein said further roller and said additional roller have axes which are inclined corresponding to an angle of a tubular track extending in an inclined manner over the inlet of the positioning device.

10. A positioning device as defined in claim 1, wherein said rollers have a solid surface and also bearing points which are covered.

11. A positioning device as defined in claim 1, further comprising a run-up element disposed in a region of an inlet of the positioning device and on which a respective foreleg of the slaughtered half runs up and which for a left half effects rotation of a cleaving side in a direction of the camera.

12. A positioning device as defined in claim 1, wherein the positioning device is a modular positioning device.

13. A positioning device as defined in claim 1, wherein said guide elements have retainers which are adjustable on said vertical supports.

14. A positioning device as defined in claim 1, further comprising an adjusting element provided on a component selected from the group consisting of a lever and a retainer of said rear guide element.

15. A positioning device as defined in claim 1, further comprising functional surfaces provided on all surfaces of the positioning device which come into contact with a slaughtered animal body and comprising an anti-microbial effect.

16. A positioning device as defined in claim 1, wherein said two guide elements are guide tubes.

* * * * *